United States Patent

Dow et al.

(10) Patent No.: US 9,329,888 B2
(45) Date of Patent: May 3, 2016

(54) COMPUTING OPTIMIZED VIRTUAL MACHINE ALLOCATIONS USING EQUIVALENCE COMBINATIONS

(71) Applicant: International Business Machines Corporation, Armonk, NY (US)

(72) Inventors: Eli M. Dow, Poughkeepsie, NY (US); James P. Gilchrist, Poughkeepsie, NY (US); Steven K. Schmidt, Essex Junction, VT (US); Charles J. Stocker, Plainsboro, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 425 days.

(21) Appl. No.: 13/751,416

(22) Filed: Jan. 28, 2013

(65) Prior Publication Data

US 2014/0215073 A1   Jul. 31, 2014

(51) Int. Cl.
*G06F 15/173* (2006.01)
*G06F 9/455* (2006.01)
*H04L 29/08* (2006.01)
*G06F 9/50* (2006.01)

(52) U.S. Cl.
CPC .......... *G06F 9/45558* (2013.01); *G06F 9/5077* (2013.01); *H04L 67/10* (2013.01); *G06F 2009/4557* (2013.01); *Y02B 60/142* (2013.01); *Y02B 60/167* (2013.01)

(58) Field of Classification Search
CPC .............................................. G06F 2009/4557
USPC .......................................................... 709/226
See application file for complete search history.

(56) References Cited

U.S. PATENT DOCUMENTS

| 8,464,267 | B2 * | 6/2013 | Uyeda et al. ............... 718/105 |
| 8,732,699 | B1 * | 5/2014 | Hyser et al. ..................... 718/1 |
| 2010/0262964 | A1 | 10/2010 | Uyeda et al. |
| 2010/0262974 | A1 | 10/2010 | Uyeda |
| 2011/0302578 | A1 | 12/2011 | Isci et al. |

(Continued)

OTHER PUBLICATIONS

"IO Tetris: Deep Storage Consolidation for the Cloud via Fine-Grained Workload Analysis," Cloud Computing (CLOUD), 2011 IEEE International Conference on, pp. 700,707, Jul. 4-9, 2011.*

(Continued)

*Primary Examiner* — Jason Recek
(74) *Attorney, Agent, or Firm* — Cantor Colburn LLP; Steven Chiu (57) ABSTRACT

A method for determining allocation of virtual machines includes: at least one of generating and accessing a list of virtual machines (VMs) configured to run on a network, each VM having at least one network resource requirement, each VM in the list associated with a size of the at least one network resource requirement; selecting at least one equivalence set of VMs having a resource requirement size that is at least substantially identical; generating a plurality of meta-combinations from the at least one equivalence set of VMs, each meta-combination representing all possible combinations of a selected number of individual VMs from the equivalence set; determining a maximum resource capacity of a node in the network; and providing a meta-combination assignment to the node, the meta-combination assignment including a group of meta-combinations having a cumulative resource requirement size value that is less than or equal to the maximum resource capacity.

23 Claims, 6 Drawing Sheets

(56) References Cited

U.S. PATENT DOCUMENTS

| | | | |
|---|---|---|---|
| 2012/0167083 A1* | 6/2012 | Suit | G06F 11/0712 718/1 |
| 2014/0089508 A1* | 3/2014 | Hawver | H04L 67/38 709/226 |
| 2014/0173593 A1* | 6/2014 | Padala et al. | 718/1 |

OTHER PUBLICATIONS

"Optimal virtual machine placement across multiple cloud providers," Services Computing Conference, 2009. APSCC 2009. IEEE Asia-Pacific , pp. 103,110, Dec. 7-11, 2009.*

"An Online Mechanism for Dynamic VM Provisioning and Allocation in Clouds," Cloud Computing (CLOUD), 2012 IEEE 5th International Conference on , pp. 253,260, Jun. 24-29, 2012.*

"Using the Multiple Knapsack Problem to Model the Problem of Virtual Machine Allocation in Cloud Computing," Computational Science and Engineering (CSE), 2013 IEEE 16th International Conference on , pp. 476,483, Dec. 3-5, 2013.*

Canali, Claudia, and Riccardo Lancellotti. "Automated clustering of virtual machines based on correlation of resource usage." Communications Software and Systems 8.4 (2012): 102-109.*

Zhang, et al. "Friendly Virtual Machines: Leveraging a Feedback-Control Model for Application adaptation". Proceedings of Virtual Execution Environments (VEE), 2005, pp. 2-12.

* cited by examiner

COMPUTING OPTIMIZED VIRTUAL MACHINE ALLOCATIONS USING EQUIVALENCE COMBINATIONS

BACKGROUND

The present invention relates to management of virtual machines (VMs), and more specifically, to methods and algorithms for optimizing VM allocations.

A contemporary virtual machine (VM) is a software implementation of a machine (i.e., a computer) that executes programs like a physical machine. The VM typically emulates a physical computing environment, but requests for central processing unit (CPU), memory, hard disk, network and other hardware resources are managed by a virtualization layer which translates these requests to the underlying physical hardware. VMs are created within a virtualization layer, such as a hypervisor or a virtualization platform that runs on top of a client or server operating system. The virtualization layer is typically used to create many individual, isolated VMs within a single, physical machine. Multiple VMs are typically used in server consolidation, where different services that were previously run on individual machines are instead run in isolated VMs on the same physical machine.

A persistent challenge to providers of cloud hosting and other network management services is the efficient use of system resources. Efficient allocation of VMs to different network nodes, e.g., network servers, is desired in order to maximize the use of network resources and reduce the number of physical servers and/or physical resources required to provide computing services to customers.

SUMMARY

According to one embodiment, a method for determining allocation of virtual machines to network nodes includes: at least one of generating and accessing a list of virtual machines (VMs) configured to run on a network, each VM having at least one network resource requirement, each VM in the list associated with a size of the at least one network resource requirement; selecting at least one equivalence set of VMs having a resource requirement size that is at least substantially identical; generating a plurality of meta-combinations from the at least one equivalence set of VMs, each meta-combination representing all possible combinations of a selected number of individual VMs from the equivalence set; determining a maximum resource capacity of a node in the network; and providing a meta-combination assignment to the node, the meta-combination assignment including a group of meta-combinations having a cumulative resource requirement size value that is less than or equal to the maximum resource capacity.

According to another embodiment, a computer program product for determining allocation of virtual machines to network nodes includes a computer readable storage medium having program code embodied therewith. The program code is readable/executable by a processor to perform a method including: at least one of generating and accessing a list of virtual machines (VMs) configured to run on a network, each VM having at least one network resource requirement, each VM in the list associated with a size of the at least one network resource requirement; selecting at least one equivalence set of VMs having a resource requirement size that is at least substantially identical; generating a plurality of meta-combinations from the at least one equivalence set of VMs, each meta-combination representing all possible combinations of a selected number of individual VMs from the equivalence set; determining a maximum resource capacity of a node in the network; and providing a meta-combination assignment to the node, the meta-combination assignment including a group of meta-combinations having a cumulative resource requirement size value that is less than or equal to the maximum resource capacity.

According to yet another embodiment, an apparatus includes at least one processing device disposed in at least one of a network node and a network control device and a storage device having instructions stored thereon. When executed by the at least one processing device, the instructions cause the apparatus to: at least one of generate and access a list of virtual machines (VMs) configured to run on a network, each VM having at least one network resource requirement, each VM in the list associated with a size of the at least one network resource requirement; select at least one equivalence set of VMs having a resource requirement size that is at least substantially identical; generate a plurality of meta-combinations from the at least one equivalence set of VMs, each meta-combination representing all possible combinations of a selected number of individual VMs from the equivalence set; determine a maximum resource capacity of a node in the network; and provide a meta-combination assignment to the node, the meta-combination assignment including a group of meta-combinations having a cumulative resource requirement size value that is less than or equal to the maximum resource capacity.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments described herein are directed to methods, apparatuses and computer program products for modeling virtual machine (VM) allocations and packing or allocating VMs to individual hosts or nodes within, e.g., a server or peer-to-peer computer network. The embodiments described herein are effective for many network applications, such as virtual machine infrastructures including those providing IaaS, PaaS or SaaS cloud hosting.

For example, consolidator or VM management software models VM allocations to hosts in order to simulate potential cloud data center VM allocations. The software leverages symbolic manipulation of VM equivalence classes (i.e., broad sets of individual, concrete VMs which are effectively clones with respect to consumption of one or more resources) to provide for optimal allocation of VMs.

In one embodiment, VMs available at run-time are grouped into various equivalence sets, which are lists of VMs that have at least substantially equivalent resource requirements. The equivalence sets may be grouped relative to a single resource type, such as memory requirements, or may be grouped relative to multiple resource types, such as memory and CPU core number requirements. A plurality of meta-combinations are generated for each equivalence set, each of which represents all possible combinations of a selected number of VMs within the respective equivalence set. The meta-combinations are configured to represent a number of VMs from an equivalence set without specifically enumerating individual concrete instances of VMs within the set. The VM management software may generate one or more meta-combination listings or assignments for each node in a network, or at least for the largest node in the network with respect to maximum resource capacity. To generate the meta-combination listing(s) or assignment(s), the software may, for example, perform an algorithm (e.g., a greedy heuristic algorithm) to select a group of meta-combinations having a cumulative resource requirement that most optimally satisfies the resource capacities of each node.

In one embodiment, a run-time satisfier or other application utilizes the meta-combinations and/or meta-combination assignments to allocate VMs to a node or nodes. For example, lists of available or unallocated VMs may be associated with equivalence classes and used to select and allocate VMs to a node according to a corresponding meta-combination assignment. Additional considerations, such as existing allocations and migration overhead, may be employed in conjunction with the meta-combination assignments to further optimize allocations.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed (e.g., any client-server model).

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
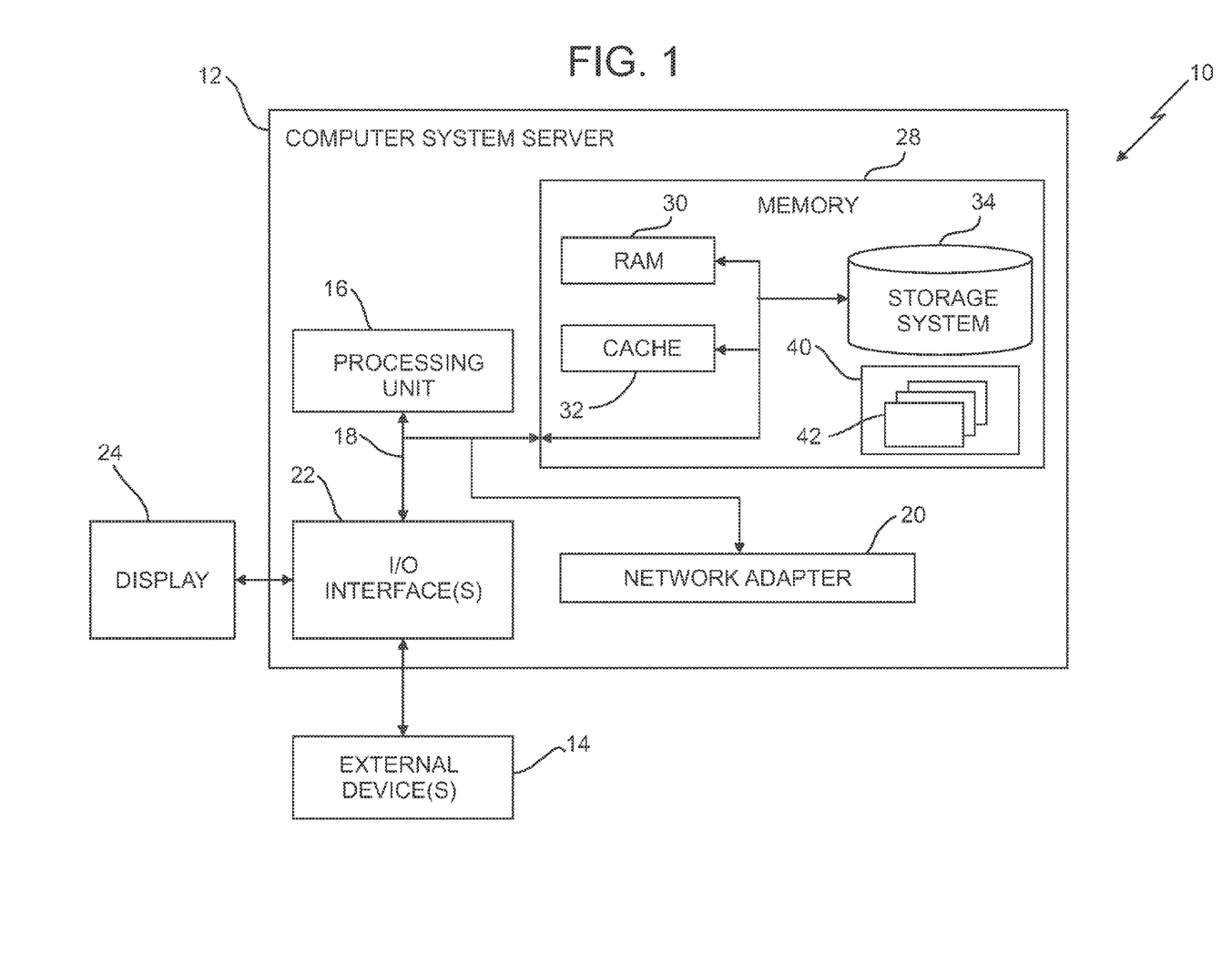
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
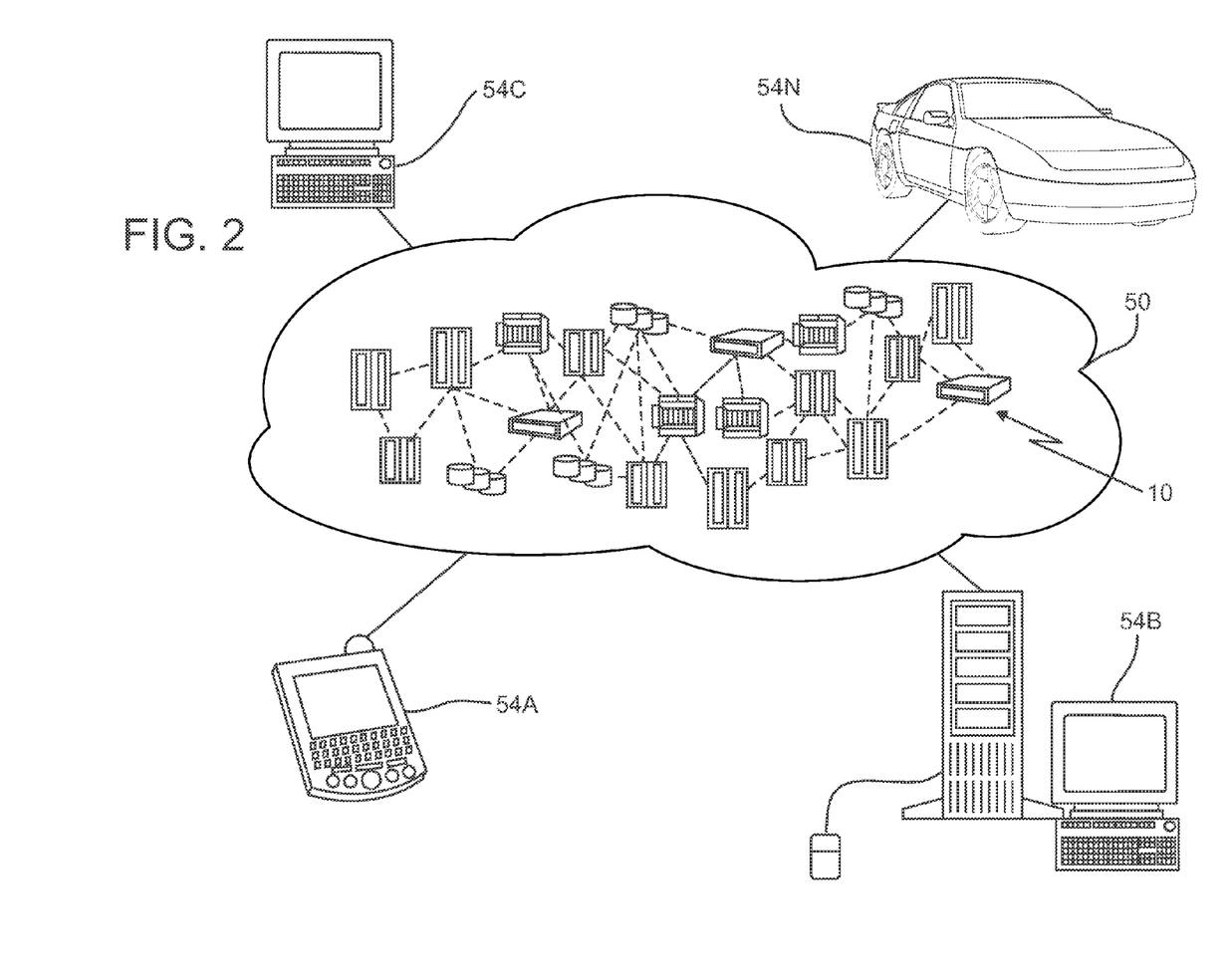
FIG. 2 depicts a cloud computing environment according to an embodiment of the present invention.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
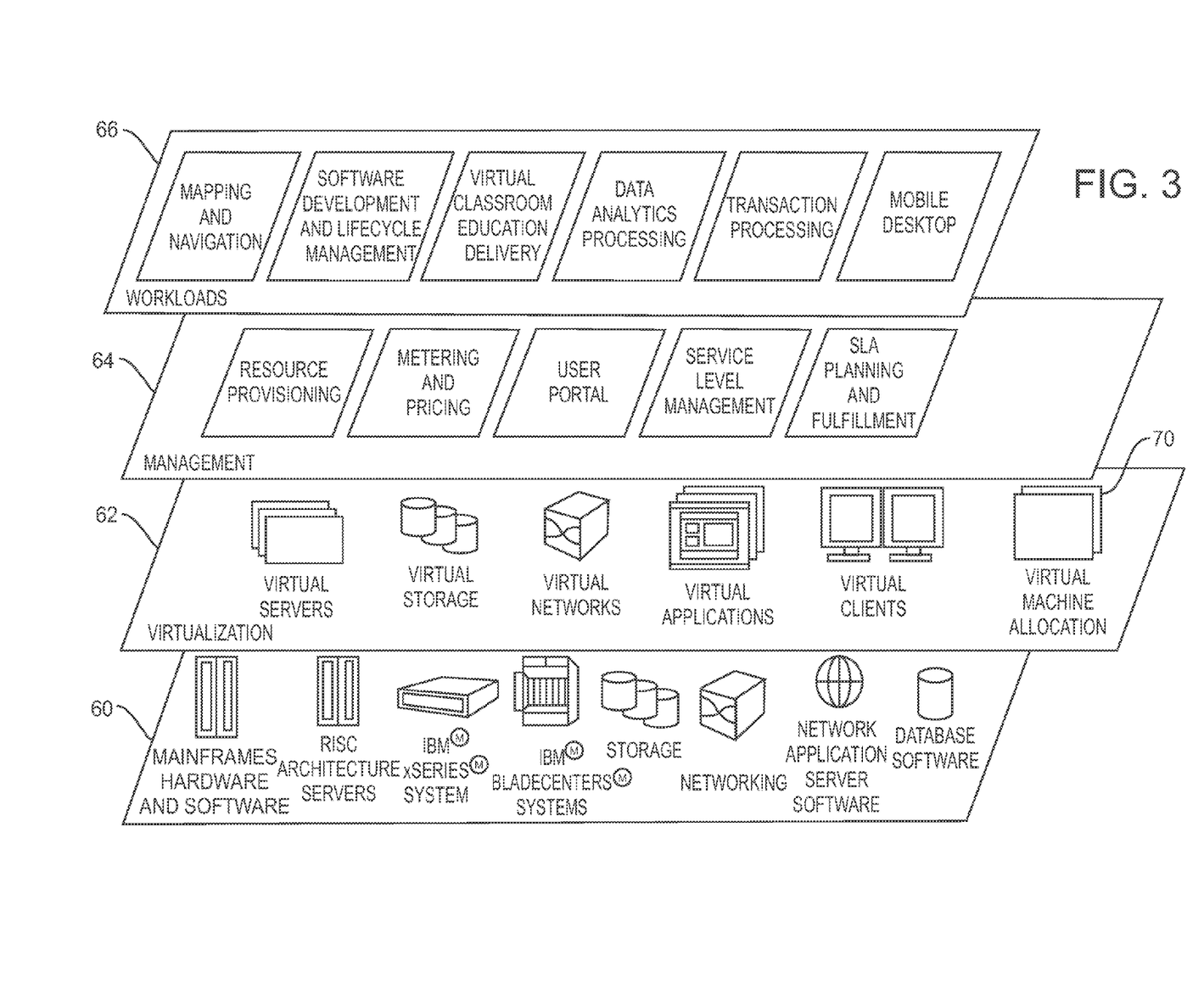
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2C® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a mobile desktop for mobile devices (e.g., 54A, 54C, and 54N, as well as mobile nodes 10 in cloud computing environment 50) accessing the cloud computing services.

In one embodiment, one or both of the hardware and software layer 60 and the virtualization layer 62 may include edge components, such as a web server front end and image cache, as well as an image library store, e.g., in a high-performance RAID storage area network (SAN). In an exemplary embodiment, an application, such as virtual machine allocation application 70 in the virtualization layer 62, may implement processes or methods for determining and/or performing virtual machine allocations as described herein; however, it will be understood that the application 70 may be implemented in any layer.

Figure 4:
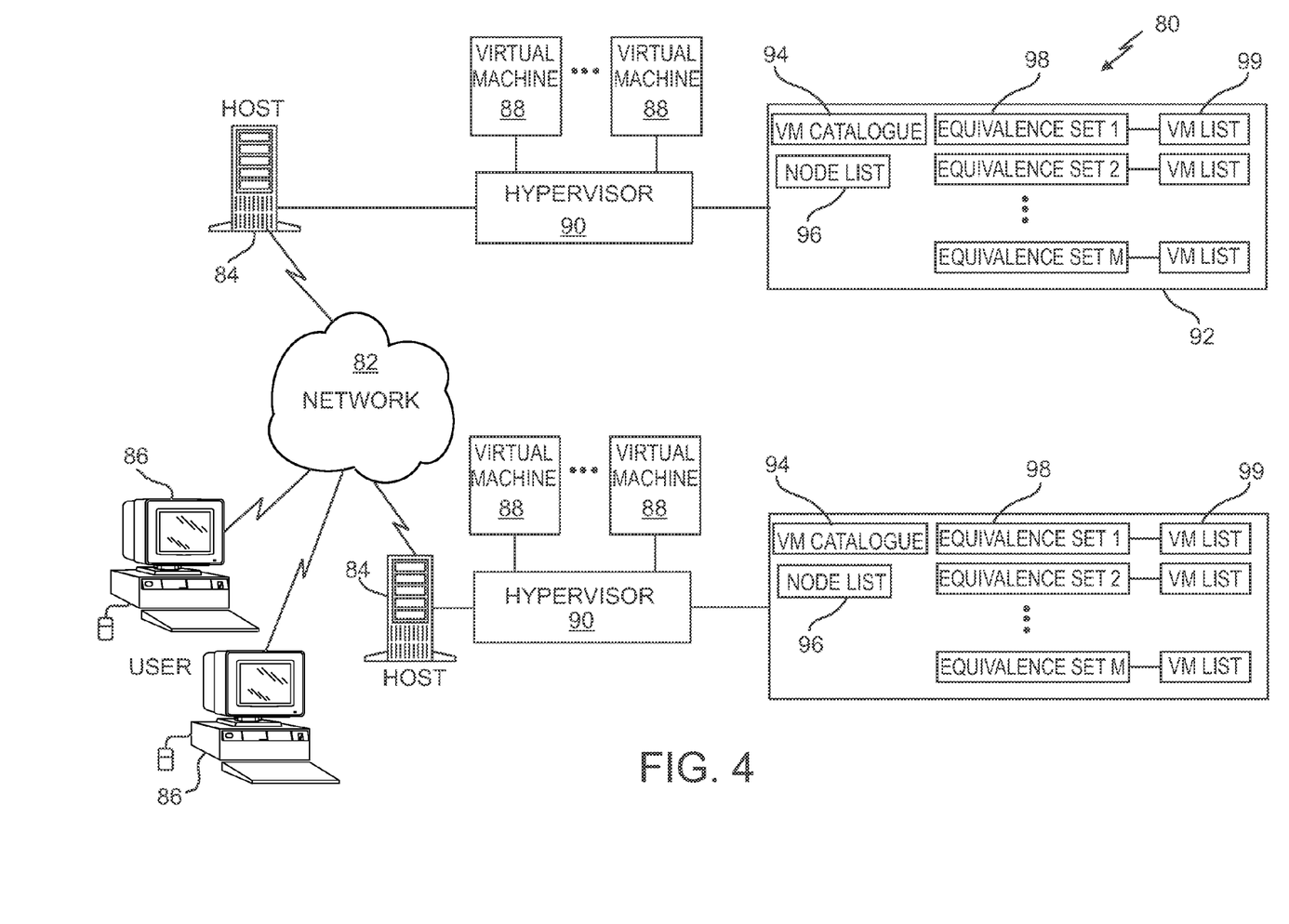
FIG. 4 depicts an exemplary network computing system including node processors configured to perform and/or facilitate virtual machine (VM) allocation.

FIG. 4 illustrates any exemplary computing system 80 that incorporates a peer-to-peer and/or client/server network 82 such as a cloud computing network that includes multiple hosts or nodes 84, such as servers. In exemplary embodiments, each node 84 include a high-speed processing device (e.g., a mainframe or server computer) including at least one processing circuit (e.g., a CPU) capable of reading and executing instructions, and handling numerous interaction requests from user or client computers 86 as a shared physical resource. Users can initiate various tasks on the nodes 84 via the user computers 86, such as developing and executing system tests, running application programs, and initiating a system migration.

The network 82 may be any type of communications network known in the art. For example, the network 82 may be an intranet, extranet, or an internetwork, such as the Internet, or a combination thereof. The network 82 can include wireless, wired, and/or fiber optic links.

In exemplary embodiments, each node 84 accesses and stores data in one or more associated data storage devices, which may include any type of storage and may comprise a secondary storage element, e.g., hard disk drive, tape, or a storage subsystem that is internal or external to the node 84. Types of data that may be stored in the source data storage device include, for example, memory included in one or more virtual machines (VMs) 88 and allocation and migration data (e.g., data structures). In an exemplary embodiment, VM configuration information and/or node memory access data is also stored in the data storage device.

In exemplary embodiments, the node 84 executes various applications, such as a node hypervisor 90 and multiple VMs 88. The term "hypervisor" refers to a low-level application that supports the execution of one or more virtual machines. The hypervisor 90 manages access to resources of the node 84 and serves as a VM monitor to support concurrent execution of the VMs. Each VM can support specific guest operating systems and multiple user sessions for executing software written to target the guest operating systems. For example, one VM may support an instance of the Linux® operating system, while a second VM executes an instance of the z/OS® operating system. Other guest operating systems known in the art can also be supported by the source hypervisor 90 through the VMs.

In exemplary embodiments, the hypervisor or other application in the node 84 executes a VM consolidator or manager 92 to perform processing described herein to determine optimal allocation of VMs and migrate VMs to and/or between various nodes 84. Various data structures, such as a VM catalogue 94 that includes a listing of available VMs and a node list 96 specifying all available nodes, may be stored and utilized by the hypervisor 90 and/or manager 92 to facilitate allocation of VMs. Additional exemplary data structures include equivalence sets 98 and associated VM lists 99, which are described in further detail below.

The systems and apparatuses described above, such as the nodes 10 and/or nodes 84, or a centralized processing device, may be used to perform and/or facilitate machine (e.g., VM) migration and packing as described herein.

Figure 5:
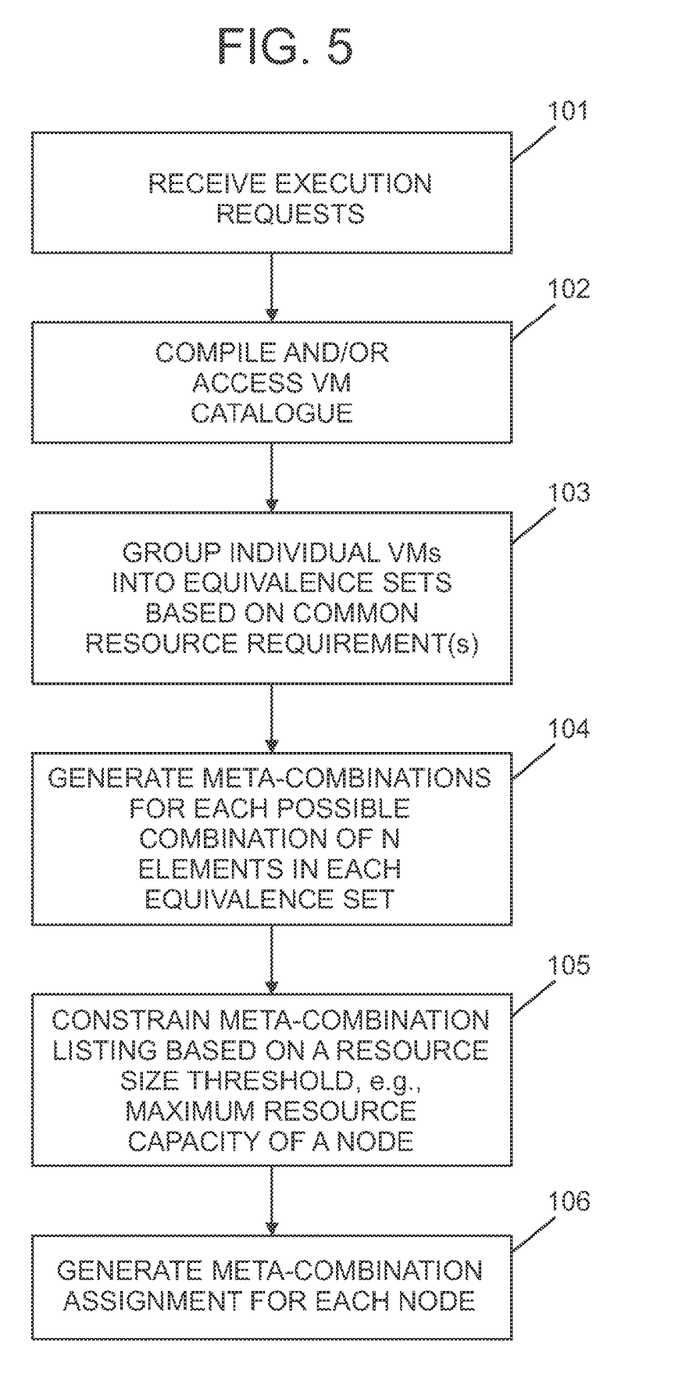
FIG. 5 is a flow chart showing a method of creating VM allocation models or assignments for efficient allocation of VMs to network nodes.

FIG. 5 illustrates a method 100 for creating VM allocation models or assignments that allow for efficient allocation of VMs to network nodes, e.g., host servers. The method 100 includes one or more stages 101-106 described herein. The method 100 is described in conjunction with the system 80, but is not so limited. The method 100 may be performed by one or more processors or other devices capable of monitoring and/or controlling VMs in a network environment, such as a hypervisor or virtual machine manager (VMM). In one embodiment, the method 100 includes the execution of all of stages 101-106 in the order described. However, certain stages may be omitted, stages may be added, or the order of the stages changed.

In the first stage 101, one or more nodes in a network, such as a cloud computing network, receive various execution requests from customer or client computers. For example, the network 82 may receive various execution requests from user computers 86.

In the second stage 102, a processor such as a hypervisor 90 compiles or accesses a group of VMs, e.g., from a VM catalogue 94 stored on the hypervisor's server, that can be configured to run in the servers or other nodes that make up a network or working group. Each specific VM has multiple resource requirements. Exemplary resource requirements include memory size, number of CPU cores, networking cumulative throughput required by the VM, network outbound and/or inbound throughput required by the VM, disk cumulative throughput for the VM, disk inbound and/or outbound throughput for the VM, and others. Each resource requirement may be considered a dimension that is used to optimally allocate VMs to an individual server.

In the third stage 103, the VMs are grouped as elements of one or more equivalence sets. Each equivalence set includes a group of VMs that are identical or near-identical with respect to one or more resource requirements. Such VMs listed in an equivalence set may be referred to a "cloned VMs" or "VM clones." The VMs do not have to be entirely identical, but rather identical from a resource size perspective, i.e., each cloned VM has a resource requirement (e.g., memory) having the same or substantially the same size. As described herein, resource "size" refers to a metric value for the resource, such as memory size, a number of CPU cores or processing or throughput speed.

Multiple equivalence sets may be generated depending on the number of different resource requirement sizes associated with available VMs. For example, FIG. 4 shows the manager 92 as accessing a number "M" of equivalence sets, which correspond to the number of different resource sizes required.

In one embodiment, each VM clone in an equivalence set has the same size requirement for a single resource type, or for any number of resource types. The embodiments described herein are not so limited, as any number or type of resource requirement may be used to generate the equivalence set. For example, an equivalence set may be generated for a group of VMs having identical resource requirements including memory space, number of cores and/or platform type. However, the equivalence set can be defined so that VMs that have relatively minor differences in specified resource requirements can be considered to be part of the equivalence set.

For purposes of discussion, a non-limiting example is described. In this example, from a group of VMs, three cloned VMs (referred to as "A", "B" and "C") having equivalent resource properties are identified. Each of A, B and C has a 128 MB RAM and two CPU cores. For these VMs, an equivalence set named "SMALL" may be generated. Any suitable designation or naming convention for the equivalence sets or other data structures described herein may be used, as the designations or naming conventions are not limited to those described herein.

In the fourth stage 104, a plurality of meta-combinations are generated or designated for each equivalence set. Each "meta-combination" is a designation representing all possible combinations of a selected number of VM elements within the equivalence set.

For example, a data structure referred to herein as a meta-combination listing or designation is first generated by creating a place holder for each equivalence set. Each placeholder is provided to designate a meta-combination from a corresponding equivalence set. It is noted that, because each VM in the equivalence set is considered identical (at least relative to resource requirements of interest), each meta-combination of VMs can be seen as a number of VMs in the combination. Thus, a meta-combination is generated for each possible number of elements.

For example, for an equivalence set that includes a number "N" of elements (i.e., individual VMs), the number of possible meta-combinations is the number of elements, i.e., N. To illustrate, consider an equivalence set designated "SET" that contains N elements. From this, N meta-combinations "SETx" can be generated, where x=1, 2 . . . N.

For an exemplary equivalence set containing three distinct VMs, N=3 and thus the number of meta-combinations is three. The equivalence set listing includes a meta-combination that represents all possible combinations of each specified number of VMs within the equivalence set, e.g., a first meta-combination has one VM and represents any single VM, a second meta-combination represents any combination of two VMs and a third meta-combination represents any combination of three VMs.

Referring again to the exemplary group of VMs (A, B and C) designated as the SMALL equivalence set, three meta-combinations can be designated. Placeholders are thus generated for a first meta-combination "SMALL1" representing any single VM from the set, a second combination "SMALL2" representing any combination of two distinct VMs from the set, and a third combination "SMALL3" representing all three VMs from the set.

Based on the known resource requirements of each VM, each meta-combination can be assigned a cumulative resource requirement. The cumulative resource requirement is determined by multiplying the number of VMs in a meta-combination by the nominal size value of the resource requirement(s).

For example, the resource requirements for each meta-combination in the SMALL set are the number of VMs in the meta-combination (i.e., the multiplier) times the nominal value for the specific measured resource requirement of any individual element in the named set. Thus, the resource requirements for SMALL×1 (A, B or C) are 128 MB RAM and 2 CPU cores, the resource requirements for SMALL×2 (any two of A, B and C) are 256 MB ram, and the resource requirements for SMALL×3 (A, B and C) are 384 MB RAM and 6 CPU cores.

It is noted that each meta-combination, which includes VM clones, represents all possible combinations of VMs in the corresponding equivalence set without enumerating each VM combination explicitly. This provides an effective way to designate allocation of VMs, especially where the majority of virtual machines are clones or copies of existing virtual machines.

In the fifth stage 105, the meta-combination listing is constrained based on the resource capabilities of one or more selected nodes. In one embodiment, the listing is constrained by constructing only those meta-combinations or groups of meta-combinations that have a cumulative resource requirement that is less than or equal to a selected per-dimension threshold (where each dimension corresponds to a selected resource type). In one embodiment, the selected threshold corresponds to the maximum resource capacity (relative to the resource types taken into account when constructing the meta-combinations and equivalence sets) of one or more nodes. Resource capacity relates to the resource capabilities of a host, i.e., relates to the maximum size value of the resource that the host is capable of supporting. In one embodiment, the threshold is given as the maximum resource capacity of the largest host on the network. For example, the cumulative memory of a meta-combination (e.g., RAM consumption) is limited to be less than the desired RAM overcommit factor times the maximum RAM in the largest host on the network.

For example, all of the meta-combinations constructed from the equivalence sets are considered, and all possible combinations of those meta-combinations (i.e., meta-combination listings) which are smaller in size than the largest host on the network are selected. Here "smaller in size" means that the cumulative resource allocation of the meta-combination for each selected dimension (such as network consumption, CPU cores required, or memory allocation) must be less than the respective maximum host value.

Any suitable algorithm may be used to select possible meta-combinations and meta-combination listings having a cumulative resource requirement that is less than or equal to the maximum resource capacity or other threshold. For example, an efficient list based algorithm is used to construct each possible meta-combination and/or meta-combination listing which is suitably small for a network based on the largest host. The algorithm performs this construction in efficient space and time by, e.g., using a scheme which expands a triangular table that resembles the shape of computing Pascal's triangle.

In one embodiment, a list of nodes and their respective resource capacities is generated to be used in assigning meta-combination listings. The resource capacities of each node are known, e.g., based on network interrogation and collection phases. At run-time, the list of hosts may be sorted from largest to smallest, knowing each host's capacity.

In the sixth stage 106, a meta-combination assignment is generated for one or more selected nodes. In one embodiment, a meta-combination assignment is generated for each node on the network, or a subset of nodes (e.g., a workgroup). The assignment for a node may be generated by the node's respective hypervisor, or by a central server or processor.

A suitable search algorithm is utilized to select the meta-combination listing that is a best fit relative to the node's resource capacity. In one embodiment, a greedy search algorithm selects the combination of meta-combinations which is a multi-dimensional best fit for the node.

In one embodiment, the algorithm is used to select a meta-combination for each of a plurality of nodes on the network. For example, the largest unfilled or available node is selected from the node list 96 and a meta-combination listing that is a best fit for the node is selected and assigned to the node. This selection is repeated for each subsequent node in the network, proceeding through the node list 96 by selecting the next largest node in the network.

For example, the largest unfilled host in the network is selected and a meta-combination listing is selected. An initial meta-combination listing selection is attempted by selecting a single resource requirement type (or at least fewer than the total number of resource requirement types that are equivalent in each meta-combination of the listing). An exemplary initial resource type is memory, which may be considered alone as memory is the resource bottleneck which is most quickly consumed from even large hosts. In situations where two or more meta-combination listing options are equivalent in memory requirements, the options may be sorted by whichever listing has meta-combinations with the fewest elements (i.e., including meta-combination(s) made up of the largest resource requirement size, and presumably harder to satisfy on smaller hardware configurations which will be processed later). In the case of a draw, this same approach can be performed based on additional resource types, such as CPU consumption, network consumption and others (using the same approach of fewer meta-combinations acting as the tie breaker).

The result is a meta-combination assignment to a node or host. Recall that a meta-combination listing is not a specific, or concrete, set of virtual machines to assign to the host, but rather what the optimal combination of VM types or groups should look like.

An exemplary meta-combination assignment is shown below. In this example, a group of VMs is organized by equivalence set relative to memory requirements. The VMs have memory requirements ranging from 1 GB of RAM to 8 GB of RAM. Four equivalence sets are determined; a "MICRO" set that includes all VMs having a memory resource requirement of 1 GB, a "SMALL" set including VMs requiring 2 GB, a "MEDIUM" set including VMs requiring 4 GB, and a "LARGE" set including VMs requiring 8 GB. For each equivalence set, a number of meta-combinations are considered. For example, the SMALL set, which includes an number N of VMs, corresponds to N meta-combinations SMALL 1, SMALL 2 . . . SMALL N.

Using the algorithms described above, a meta-combination listing selected from the possible meta-combinations is provided for a node having a memory capacity of 20 GB:

[(SMALL3:2×3),(MEDIUM1:4×1),(LARGE1:8×1),(MICRO2:1×2)–20].

This meta-combination listing includes four meta-combinations: a meta-combination including three elements from the SMALL set (each element of SMALL uses 2 GB RAM, yielding 6 GB RAM use for this meta-combination), one element from the MEDIUM set (each element of MEDIUM uses 4 GB RAM, yielding 4 GB RAM use for this meta-combination), one element from the LARGE set (each element of LARGE uses 8 GB RAM, yielding 8 GB RAM use for this meta-combination), and two elements from the MICRO set (each element of MICRO uses 1 GB RAM, yielding 2 GB RAM use for this meta-combination). The trailing tag -20 indicates the overall memory consumption of the meta-combination listing (i.e., 20 GB).

The meta-combination listing may be generated as a selected data structure, such as metadata for a host. An exemplary data structure is a part of an open virtualization format (OVF) package, e.g., a virtual machine contract (VMC) in the package.

In one embodiment, multiple meta-combination listings are stored as a list that is accessible by a server hypervisor or other processor that assigns VMs to a host. A sorted list of meta-combination listings, with the most optimal meta-combination listing first, is provided. For example, the above meta-combination listing example would be first of a list or group of meta-combination listings having a combined memory requirement of 20 GB. The assigning processor need only select the first available meta-combination listing as the assignment, and select VMs from each equivalence set according to each meta-combination.

Figure 6:
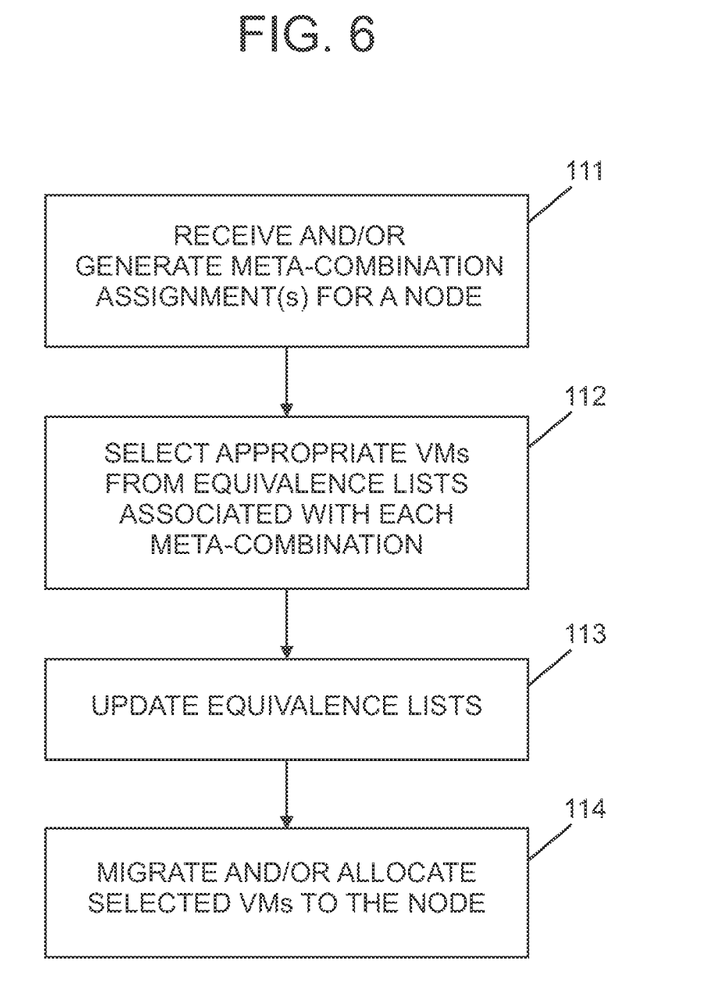
FIG. 6 is a flow chart showing a method of allocating VMs to selected network nodes.

FIG. 6 illustrates a method 110 for allocating VMs to selected nodes, which may include migrating VMs and/or packing VMs to the selected nodes. The method 110 includes one or more stages 111-114 described herein. The method 110 is described in conjunction with the system 80, but is not so limited. The method 110 may be performed by one or more processors or other devices capable of monitoring and/or controlling virtual machines in a network environment, such as a hypervisor or virtual machine manager (VMM). In one embodiment, the method 110 includes the execution of all of stages 111-114 in the order described. However, certain stages may be omitted, stages may be added, or the order of the stages changed.

In the first stage 111, a processor of a node, such as the hypervisor 90 and/or VM manager 92, generates or receives one or more meta-combination assignments for the node. The meta-combination assignment includes one or more of the meta-combination listings selected via the method 110.

In the second stage 112, the processor, at run-time, accesses the meta-combination assignment and selects available VMs (e.g., concrete, discrete VM instances) that satisfy each meta-combination in the assignment. In one embodiment, the processor selects a meta-combination listing from a list or group of listings.

For each meta-combination, the processor accesses a list of VMs in an equivalence set list 96 associated with that meta-combination. Available VMs from the equivalence set list 96 are selected for allocation and/or migration to the node.

Referring to the exemplary meta-combination assignment described above, in that example, the manager 92 selects the number of VMs for each equivalence set specified by the meta-combinations. For example, three VMs are selected from the SMALL set one VM is selected from the MEDIUM set, one VM is selected from the LARGE set and two VMs are selected from the MICRO set. Each equivalence set may be appropriately ordered so that suitable available VMs can be selected from the top of each list, thereby simplifying selection.

Any of various algorithms may be utilized to perform this selection of VMs. For example, a hypervisor (e.g., at run-time) can efficiently attempt to satisfy the meta-combinations in a modified Best Fit First search. This task is simplified, e.g., by maintaining one linked list, referred to as a "concrete instance list" or VM list 99, per equivalence set 98 of unallocated or unassigned concrete candidate elements (i.e., a specific VM instance) of that set. The hypervisor selects the first N items from the list if N are available as per the meta-combination specification.

In one embodiment, multiple meta-combination assignments are provided for the node. The assignments may be organized by desirability to allow the processor to select another listing if the most optimal meta-combination assignment cannot be filled. For example, if there are insufficient concrete instances, the hypervisor may go up a step and select the next most optimal meta-combination assignment and attempt to satisfy that until there is a concrete satisfaction found.

In one embodiment, at selection time, any VM candidate selection can be checked against any additional criteria or restrictions. For example, each listed VM may be checked so as to not co-locate blacklisted virtual machine pairs, and may preferentially place contract specified pairs of VMs.

In one embodiment, the listing or other data structure representing available and allocated VMs (e.g., the VM catalogue 94 and/or VM lists 99) is maintained by dynamically mapping existing allocations of VMs on nodes in a network. In this embodiment, the method 110 includes comparing the selected meta-combination assignment for a server or other node to the existing allocation to determine whether existing allocations match or otherwise satisfy the allocation prescribed by the meta-combination assignment.

VM listings may be maintained to monitor VM allocations during run-time. Each existing VM in the listing and/or mapping may be tagged with a notation that is identical or sufficiently similar to the meta-combination notation so that re-allocation of resources can be omitted if an exact match or similarity to one of the prescription meta-combination allocations is already is present on the network.

The dynamically updated VM listing or mapping may be consulted during the selection stage to determine whether existing allocated combinations of VMs are available that are at least similar to optimal combinations represented by the meta-combination assignment. For example, an algorithm is used that selects existing close combinations of VMs by determining the migration overhead to convert such existing combinations it into an optimal allocation prescribed by the meta-combination assignment. The migration overhead may be determined by examining, e.g., the number of VMs which would need to be evacuated from the node, plus the number of VMs which would need to be imported along with the RAM sizes of those virtual machines. These values allow one to predict (based on known network bandwidth, and existing throughput formulas) the time to optimal placement as well as the duration of possible perturbation of the virtual machines being migrated. This may allow the processor to make migration decisions which result in fewer perturbations of existing virtual machines. The VM listings or mapping may also include a specification for a given virtual machine or set of virtual machines of relative gravity, by which those machines tend not to be live migrated. Migration of these VMs can be avoided, and other VMs in the list may be migrated to them when dynamic re-balancing needs to occur.

In the third stage 113, the listing of available VMs is updated to reflect already allocated or newly unavailable VMs. For example, when concrete VMs from the VM catalogue and/or equivalence set listings 98 are allocated, they are removed therefrom.

In the fourth stage 114, the selected VMs are allocated or packed to the appropriate node. This may be accomplished by migrating or moving the selected VMs from a storage location or another node on the network.

Technical effects and benefits include providing for efficient use of network resources by optimally allocating or packing VMs to network nodes or hosts. For example, the systems and apparatuses described herein allow for packing virtual machines on to a minimum number of hosts to thereby allow power savings and efficiencies, e.g., by disabling or dynamically powering down some hosts. The methods described herein can be performed within an acceptable time frame to avoid delays in executing network requests.

Prior art methods do not allow for effective determination of algorithms. For example, brute force methods are far too slow to be feasible in cloud computing applications. Likewise, multithreaded algorithms proved to be too slow for moderate to large cloud applications (e.g., more than about 30 VMs). Solving VM allocations in general is known to be an NP-hard problem related to the knapsack problem as well as other n-dimensional specified packing problems. Thus, computing all possible packings of N virtual machines on H hosts is NAH possible combinations, and even if computed in parallel with many threads is intractable for short runtimes (dynamic frequent reconsolidation). The embodiments described herein provide methods for solving allocation problems that address these issues and provide improved heuristic solving techniques.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining allocation of virtual machines to network nodes, comprising:
   at least one of generating and accessing a list of virtual machines (VMs) configured to run on a network, each VM having at least one network resource requirement, each VM in the list associated with a size of the at least one network resource requirement;
   selecting a plurality of equivalence sets of VMs, each equivalence set including only VMs having an identical resource requirement size;
   generating a group of meta-combinations, each meta-combination corresponding to a respective equivalence set of the plurality of equivalence sets of VMs, each meta-combination representing all possible combinations of individual VMs from the respective equivalence set, each meta-combination and each possible combination representing a number of VMs without specifically enumerating individual VMs;
   determining a maximum resource capacity of a node in the network;
   generating a meta-combination listing, wherein the meta-combination listing includes one or more meta-combinations selected from the group of meta-combinations, the meta-combination listing representing a cumulative resource requirement size that is less than or equal to the maximum resource capacity, and
   providing a meta-combination assignment to the node, the meta-combination assignment including a list of meta-combination listings, each list having the cumulative resource requirement size and a having a different set of meta-combination listings.

2. The method of claim 1, wherein selecting the at least one equivalence set includes selecting at least a first equivalence set of VMs having a first resource requirement size and a second equivalence set having a second resource requirement size that is different than the first resource requirement size.

3. The method of claim 2, wherein generating the plurality of meta-combinations includes generating at least a first plurality of meta-combinations from the first equivalence set and a second plurality of meta-combinations from the second equivalence set.

4. The method of claim 1, wherein providing the meta-combination assignment includes generating a plurality of groups of different meta-combinations and selecting the group that is closest to the maximum resource capacity.

5. The method of claim 1, wherein providing the meta-combination assignment includes selecting the group of meta-combinations based on a greedy search algorithm to find the group that represents a multi-dimensional best fit for the node.

6. The method of claim 1, wherein providing the meta-combination assignment includes generating a list of all possible groups of meta-combinations having a combined resource requirement that is less than or equal to the maximum resource capacity.

7. The method of claim 1, wherein the network includes a plurality of nodes, determining a maximum resource capacity includes determining a maximum resource capacity of each of the plurality of nodes, and providing the meta-combination assignment includes generating a plurality of meta-combination assignments and providing a meta-combination assignment for each of the plurality of nodes.

8. The method of claim 1, wherein the network includes a plurality of nodes, and the maximum resource capacity is the maximum resource capacity of the largest node in the network.

9. The method of claim 1, wherein the resource requirement is selected from at least one of memory size, number of CPU cores, networking throughput required and disk throughput required.

10. A computer program product for determining allocation of virtual machines to network nodes, the computer program product comprising a non-transitory computer readable storage medium having program code stored thereon, the program code readable/executable by a processor to perform a method comprising:
    at least one of generating and accessing a list of virtual machines (VMs) configured to run on a network, each VM having at least one network resource requirement, each VM in the list associated with a size of the at least one network resource requirement;
    selecting a plurality of equivalence sets of VMs, each equivalence set including only VMs having an identical resource requirement size;
    generating a group of meta-combinations, each meta-combination corresponding to a respective equivalence set of the plurality of equivalence sets of VMs, each meta-combination representing all possible combinations of individual VMs from the respective equivalence set, each meta-combination and each possible combination representing a number of VMs without specifically enumerating individual VMs;
    determining a maximum resource capacity of a node in the network;
    generating a meta-combination listing, wherein the meta-combination listing includes one or more meta-combinations selected from the group of meta-combinations, the meta-combination listing representing a cumulative resource requirement size that is less than or equal to the maximum resource capacity; and
    providing a meta-combination assignment to the node, the meta-combination assignment including a list of meta-combination listings, each list having the cumulative resource requirement size and a having a different set of meta-combination listing.

11. The computer program product of claim 10, wherein selecting the at least one equivalence set includes selecting at least a first equivalence set of VMs having a first resource requirement size and a second equivalence set having a second resource requirement size that is different than the first resource requirement size.

12. The computer program product of claim 11, wherein generating the plurality of meta-combinations includes generating at least a first plurality of meta-combinations from the first equivalence set and a second plurality of meta-combinations from the second equivalence set.

13. The computer program product of claim 10, wherein providing the meta-combination assignment includes generating a plurality of groups of different meta-combinations and selecting the group that is closest to the maximum resource capacity.

14. The computer program product of claim 10, wherein providing the meta-combination assignment includes selecting the group of meta-combinations based on a greedy search algorithm to find the group that represents a multi-dimensional best fit for the node.

15. The computer program product of claim 10, wherein providing the meta-combination assignment includes generating a list of all possible groups of meta-combinations having a combined resource requirement that is less than or equal to the maximum resource capacity.

16. The computer program product of claim 10, wherein the network includes a plurality of nodes, and the maximum resource capacity is the maximum resource capacity of the largest node in the network.

17. An apparatus comprising:
at least one processing device disposed in at least one of a network node and a network control device; and
a storage device having instructions stored thereon that, when executed by the at least one processing device, cause the apparatus to:
at least one of generate and access a list of virtual machines (VMs) configured to run on a network, each VM having at least one network resource requirement, each VM in the list associated with a size of the at least one network resource requirement;
select a plurality of equivalence sets of VMs, each equivalence set including only VMs having an identical resource requirement size;
generate a group of meta-combinations, each meta-combination corresponding to a respective equivalence set of the plurality of equivalence sets of VMs, each meta-combination representing all possible combinations of individual VMs from the respective equivalence set, each meta-combination and each possible combination representing a number of VMs without specifically enumerating individual VMs;
determine a maximum resource capacity of a node in the network;
generate a meta-combination listing, wherein the meta-combination listing includes one or more meta-combinations selected from the group of meta-combinations, the meta-combination listing representing a cumulative resource requirement size that is less than or equal to the maximum resource capacity; and
provide a meta-combination assignment to the node, the meta-combination assignment including a list of meta-combination listings, each list having the cumulative resource requirement size and a having different set of meta-combination listings.

18. The apparatus of claim 17, wherein the apparatus is configured to select the at least one equivalence set by selecting at least a first equivalence set of VMs having a first resource requirement size and a second equivalence set having a second resource requirement size that is different than the first resource requirement size, and generating the plurality of meta-combinations includes generating at least a first plurality of meta-combinations from the first equivalence set and a second plurality of meta-combinations from the second equivalence set.

19. The apparatus of claim 17, wherein the apparatus is configured to generate a plurality of groups of different meta-combinations and select the group that is closest to the maximum resource capacity as the meta-combination assignment.

20. The apparatus of claim 17, wherein the apparatus is configured to select the group of meta-combinations based on a greedy search algorithm to find the group that represents a multi-dimensional best fit for the node.

21. The apparatus of claim 17, wherein the apparatus is configured to generate a list of all possible groups of meta-combinations having a combined resource requirement that is less than or equal to the maximum resource capacity.

22. The apparatus of claim 17, wherein the network includes a plurality of nodes, and the maximum resource capacity is the maximum resource capacity of the largest node in the network.

23. The apparatus of claim 17, wherein the network is a cloud computing network.

* * * * *